United States Statutory Invention Registration [19]

[11] Reg. Number: H492

Kong et al. [43] Published: Jul. 5, 1988

[54] SAFE/ARM DEVICE

[75] Inventors: Jerome A. Kong; David L. Riggs, both of Ridgecrest, Calif.

[73] Assignee: The United States of America as represented by the Secretary of the Navy, Washington, D.C.

[21] Appl. No.: 145,000

[22] Filed: Jan. 15, 1988

[51] Int. Cl.[4] ..... F42C 15/32

[52] U.S. Cl. ..... 102/229; 102/223

[56] References Cited

U.S. PATENT DOCUMENTS

| | | | |
|---|---|---|---|
| 3,532,057 | 10/1970 | Aubrey | 102/229 |
| 3,631,803 | 1/1971 | Davis | 102/229 |
| 3,675,579 | 7/1972 | Min | 102/229 |
| 3,889,598 | 6/1975 | Belsley | 102/229 |
| 3,967,556 | 7/1976 | Post et al. | 102/229 X |
| 4,380,197 | 4/1983 | Eaton | 102/228 |

*Primary Examiner*—David H. Brown

*Attorney, Agent, or Firm*—William C. Townsend; W. Thom Skeer; Peter A. Lipovsky

[57] ABSTRACT

A safe/arm device has a rotor that aligns or misaligns a path for an explosive. The rotor is aligned by the effects of a fluid pressure differential acting upon a piston of the device. This pressure differential causes the piston to translationally move and this movement is transmitted to the rotor by a shaft. The shaft fits within an axial bore defined by the rotor. This axial bore in turn defines a helical groove. A ball, partially recessed within a well defined by the shaft, rides within this helical groove. As the shaft is translationally driven within the axial bore, the helical groove of the rotor tracks the ball. Translational movement of the shaft is thereby converted to rotational movement of the rotor. As a safeguard, the shaft is split into two sections, one in engagement with the piston and the other in engagement with the rotor. By this arrangement, a predetermined amount of movement of the piston is required before this movement is transmitted to the rotor. Further, a detent mechanism has been incorporated in the device to keep the rotor locked in place until there has been sufficient piston movement.

10 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SAFE/ARM DEVICE

BACKGROUND OF THE INVENTION

1. Field of the Invention

The invention pertains generally to switching systems. More particularly, the invention relates to pressure actuated switches. In greater particularity, but without limitation thereto, the invention pertains to a switch that aligns or misaligns a path for an explosive upon the influence of a fluid pressure differential.

2. Description of the Prior Art

In numerous situations, it is desirable to have a switching device that can be set at one position or another. When such devices are employed in the explosive arts, they are often termed safe/arm devices. The purpose of these devices is to commit an explosive to either a safe or an armed operating position.

In certain applications, it is considered to be desirable that a safe/arm switching device be operable by the effects of a fluid differential acting upon the device.

A prior art safe/arm switching device that is actuated by such a differential is known to incorporate a spring that becomes loaded by the force of a certain fluid pressure acting upon the device. The loading of the spring, and a subsequent unloading thereof, converts an initial, translational movement of a pressure driven piston into a final, rotational movement of an explosive path, interrupter/aligner—rotor. In this particular device, the spring provides a relatively indirect means of coupling the translationally moveable piston to the rotationally moveable rotor. Another fluid actuated safe/arm device employs a pressure driven, translationally moveable piston that is directly coupled to a rotatable combination shaft and rotor. Though this device is a more straightforward approach than the aforementioned spring design, the direct link between the piston and shaft/rotor makes this embodiment sensitive to pressure fluctuations other than those meant to actuate the device.

SUMMARY OF THE INVENTION

The present invention is a fluid pressure activated safe/arm device. The device incorporates a piston that is translationally moveable by a predetermined pressure differential acting thereon. This pressure differential is opposed by a biasing spring, which substantially prevents movement of the piston until the differental is reached. The biasing spring also assists in returning the piston to its original position once the pressure differential subsides from the predetermined leval. The safe/-arm device of the invention further includes a disk-shaped rotor, mounted for rotation between a safe and an armed position. When in the safe position, the rotor interrupts a path for an explosive. Alternatively, when in the armed position, the rotor provides an unobstructed path for the explosive. Movement of the piston is transmitted by a shaft to the rotor. This shaft, fixedly attached to the piston at one end, is axially aligned with an axial bore defined by the rotor. The shaft has a free end that is moveable within this axial bore. Translational movement of the shaft is converted to rotational movement of the rotor by way of a driving ball. The driving ball is partially received within a well that is defined by the shaft and is located adjacent the periphery of the rotor's axial bore. Additionally, the driving ball is partially received within a helical groove defined by the periphery of the axial bore of the rotor. The helical groove of the rotor tracks the translationally driven ball, thereby imparting a rotational movement to the rotor. This arrangement of elements permits the device not only to switch from a safe position to an armed position but the opposite as well, such as in the case where the pressure differential upon the piston raises above the predetermined magnitude only to later decline below this magnitude. The driving force in this latter instance is the biasing spring which, as discussed, acts upon the piston in opposition to the differential fluid pressure.

To compensate for impact loadings to the device caused by such things as either rough handling or momentary but extreme ambient pressure fluctuations, safeguard features such as a delay transmission split shaft and a movement arresting mechanism have been incorporated in the device. In the device, the shaft is split between a rod section and a tubular section: the rod section being fastened to the piston, and the tubular section being that part of the shaft engaging the rotor. The rod section slideably engages a cylinder within the tubular section. The two sections are dimensioned so that a certain amount of travel of the piston is necessary before movement thereof is transmitted to the rotor. Further, a movement-arresting detent mechanism is provided, operable by the movement of the rod section within the tubular section of the shaft, so that movement of the tubular section of the shaft and rotational movement of the rotor is precluded until there has been sufficient piston travel. To provide rotor position information, among other things, a circuit is disposed in contact with the rotor. Further, a lock mechanism, operable either by feedback information from the rotor circuit or by independent means, provides a means by which the rotor can be locked either in the safe or the armed position.

OBJECTS OF THE INVENTION

It is an object of the invention to provide a pressure driven safe/arm switching device that will switch from a safe position to an armed position upon a fluid pressure differential of predetermined magnitude acting thereon.

Another object of the invention is to provide a pressure driven safe/arm switching device that will switch from an armed position to a safe position when a fluid pressure differential acting thereon falls below a predetermined magnitude.

Another object of the invention is to provide a pressure driven safe/arm switching device that provides a relatively direct means of transforming the effects of impinging pressure into switch operation.

Yet another object of the invention is to provide a switching device that is not vulnerable to false switching signals.

BRIEF DESCRIPTION OF THE DRAWINGS

These and other objects will become apparent from the following detailed description of the invention when considered in conjunction with the accompanying drawings in which.

DESCRIPTION OF THE PREFERRED EMBODIMENT

Figure 1:
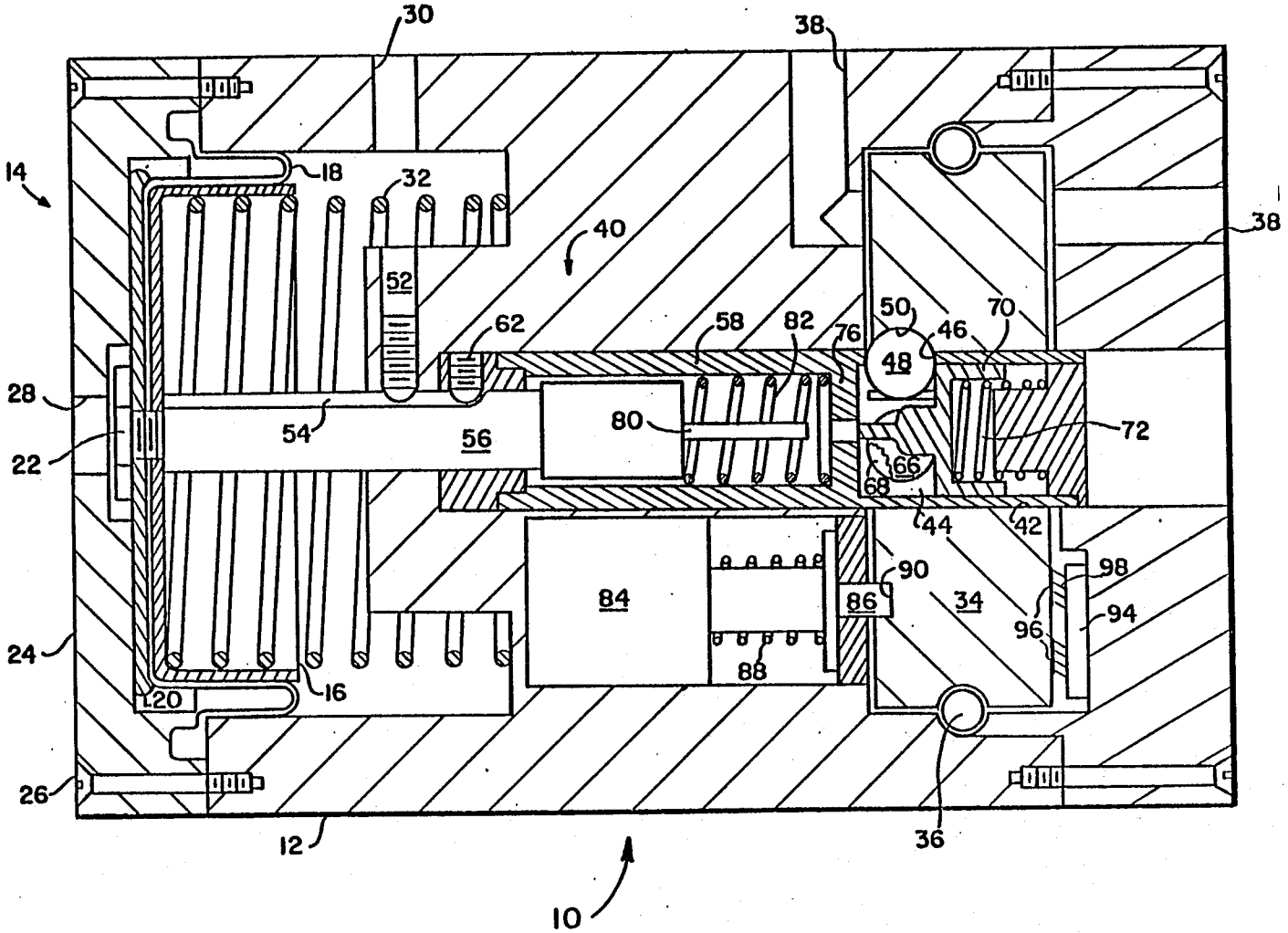
FIG. 1 is a side elevation partly in section of the device according to the invention in which the device is in a safe position.
Figure 2:
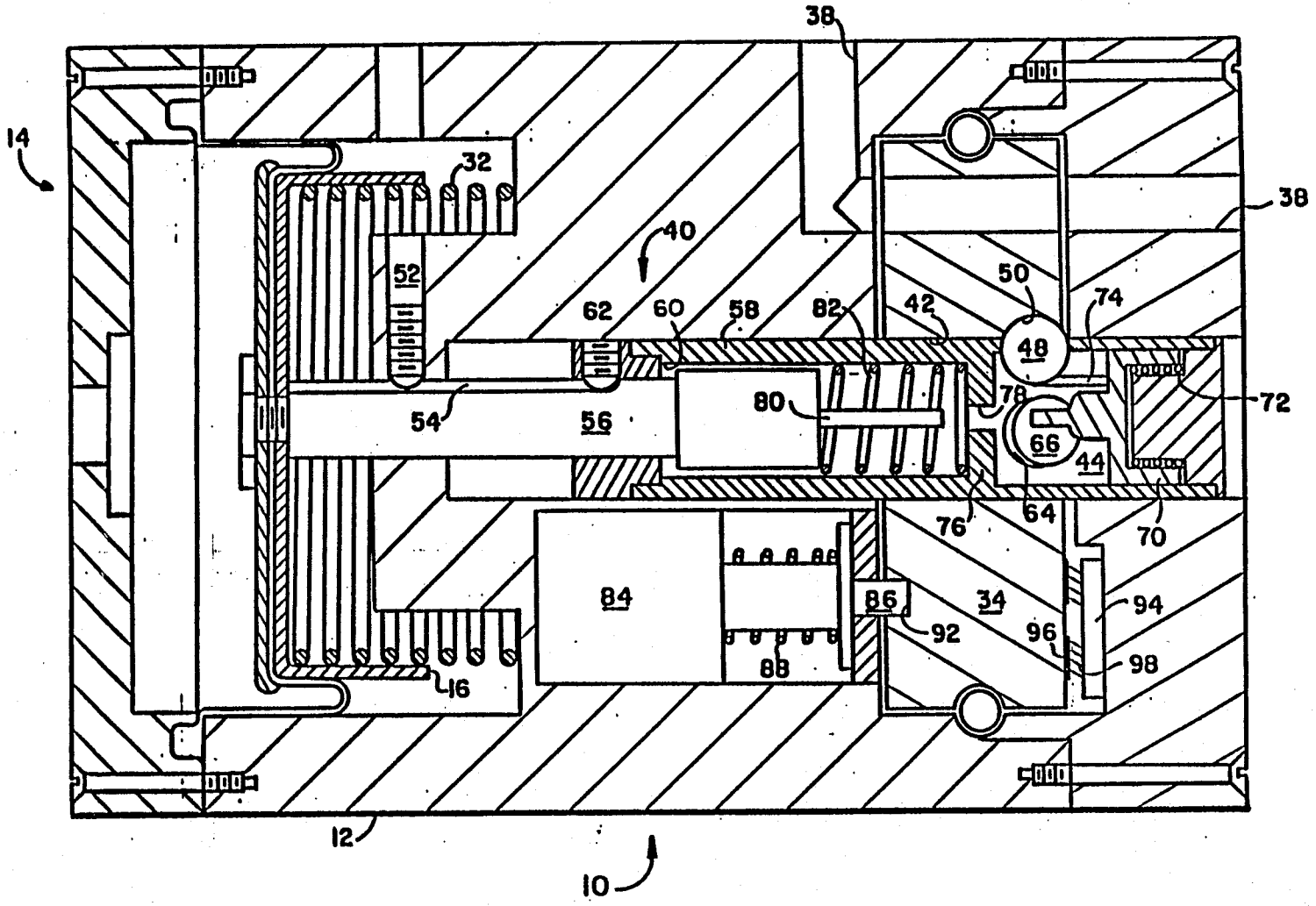
FIG. 2 is a view similar to that of FIG. 1 in which the device is in an armed position.

Referring now to FIG. 1, there is shown a pressure driven safe/arm switching device 10 of the present invention. Device 10 has a generally hollow housing 12 having an open end shown generally at 14. Disposed within housing 12 and being in slideable engagement therewith is a piston 16, shown in a first position proximate to open end 14. Piston 16 is dimensioned so as to substantially close open end 14 of housing 12. As is apparent, a rolling seal 18 is used to provide an airtight seal between piston 16 and housing 12. Rolling seal 18 is secured to piston 16 by a washer 20 and by a conventional fastener 22. Further, seal 18 is peripherally secured to housing 12 by a lid 24 attached to housing 12 by conventional fasteners 26. Of course, other means of providing a sealing fit between piston 16 and housing 12 are possible as these would be apparent to those skilled in the relevant art. Lid 24 defines an aperture 28 through which a first fluid pressure is conducted to impinge upon the crown of piston 16. Similarly, housing 12 has an opening, such as aperture 30, through which a second fluid pressure is conducted to impress upon the interior surface of piston 16. Aperture 30 also serves to bleed or vent housing 12. A biasing spring 32 is disposed within housing 12 and abuts piston 16 to maintain piston 16 in the first position, shown. Spring 32 is chosen of a length and spring constant so that its strength permits piston 16 to stroke only at or above a preselected pressure differential of the first minus the second fluid pressures. Housing 12 further includes a rotor 34 that is mounted for rotation upon a set of conventional bearings 36. Rotor 34 is rotatable between a safe position in which a path 38 for explosives is interrupted, shown, and an armed position in which path 38 is uninterrupted, as is shown in FIG. 2. As is apparent, piston 16 is translationally moveable longitudinally with respect to housing 12.

This translational movement is transmitted to a two-piece telescoping shaft, shown generally at 40. Shaft 40 is fixedly attached at one end to piston 16 by means such as the fastener 22. Shaft 40 transmits the translational movement of piston 16 to rotor 34. As can be seen, shaft 40 is generally coaxially aligned with an axial bore 42 defined by rotor 34 and has a free end that is moveable within axial bore 42. Shaft 40 defines a well 44 having an opening 46 adjacent the periphery of axial bore 42. A driving ball 48 is partially received within well 46. In complimentary fashion to well 46, axial bore 42 of rotor 34 defines a helical groove 50 in which the remainder of driving ball 48 is received. Ball 48 is precluded from receding from operable engagement with helical groove 50 by elements of the invention to be discussed.

In operation, a differential pressure greater than or equal to a preselected magnitude causes piston 16 to travel from the first position shown in FIG. 1 to a second position shown in FIG. 2. This piston travel is transferred to shaft 40, which in turn drives ball 48 translationally within helical groove 50. Helical groove 50 of rotor 34 tracks the translationally driven ball, thereby imparting a rotational movement to the rotor to the switch rotor from the safe position, shown in FIG. 1, to the armed position, shown in FIG. 2. Shaft 40 is precluded from inadvertently rotating by a guide member 52, which slideably engages a longitudinal slot 54 defined by shaft 40. Once the differential fluid pressure declines from the preselected magnitude, rotor 34 is returned to the safe position due to the biasing effect of spring 32 acting upon piston 16.

Irregular movements of piston 16, caused by, for instance, rough handling of device 10 or by minor impulsive pressure loadings upon device 10, are prevented from possibly "arming" device 10 by the two-piece telescoping shaft 40. Referring to FIGS. 1 and 2, it can be seen that shaft 40 has a rod section 56, fixedly attached to piston 16, and a tubular section 58, extending through and engaging rotor 34. Tubular section 58 defines the well 44 at a first end thereof and, as can be seen, defines an open-ended cylinder 60, best shown in FIG. 2, at a second end thereof in which a free end of rod section 56 is slideably received. To preclude rod section 56 from being withdrawn from cylinder 60, a stop member 62 is attached to section 58 and is slideably received within longitudinal slot 54 of rod section 56. This arrangement also precludes the two sections from rotating with respect to each other. By splitting shaft 40 into two sections, piston 16 and attached rod section 56 can undergo limited translational movement without causing rotor 34 to rotate. If, however, the differential between the first and second pressures reaches the predetermined magnitude, rod section 56 will travel a preselected distance within cylinder 60 of tubular section 58 until movement of the rod section is transferred to the tubular section. This transfer is done either by a mechanism to be discussed, or by, for example, a direct abutment of rod section 56 with tubular section 58. Ultimately, movement of piston 16 from the first position, shown in FIG. 1, to the second position, shown in FIG. 2, will cause rotor 34 to rotate to the armed position shown in FIG. 2. In complimentary fashion, a decline in the pressure differential from the predetermined magnitude will cause piston 16 to travel from the second position to the first position. The now withdrawing rod section 56 will abut the stop member 62 attached to tubular section 58, to thereby ultimately rotate rotor 34 back to the safe position shown in FIG. 1. In either instance, rotor 34 will be caused to rotate only upon full travel of rod section 56 within cylinder 60.

To further prevent a possible false "arming" of device 10, a rotor arresting mechanism has been incorporated into the device of the invention. Referring again to FIGS. 1 and 2, there can be seen a detent well, in this case being one and the same as well 44, that is defined by tubular section 58. Detent well 44 has an opening 64, best shown in FIG. 2, that is adjacent the periphery of axial bore 42. As is shown in FIG. 1, when piston 16 is in the first position and rotor 34 is in the corresponding safe position, a detent ball 66 projects into opening 64 and into a corresponding indentation 68 defined by axial bore 42, shown through the cut-away of ball 66. A detent 70, biased by a spring 72, serves to urge ball 66 into this arresting position, shown in FIG. 1, to thereby preclude rotor 34 from rotating. When ball 66 is in this position, tubular section 58 is also precluded from moving translationally. To prevent driving ball 48 from withdrawing from helical groove 50, two rods 74, one of which has been removed for clarity, are attached to detent 70 in engagement with ball 48.

As can be seen from the FIGURES, a bulkhead 76 separates cylinder 60 from detent well 44. Bulkhead 76 defines a passage 78 by which cylinder 60 and detent well 44 communicate. In operation, a plunger 80, attached to the free end of rod section 56, travels through passage 78 to engage detent 70 when piston 16 moves from the first to the second position. Rod section 56 travels a predetermined distance within tubular section 58 and by way of plunger 80 moves detent 70 in opposition to spring 72 so that detent ball 66 falls within well 44 and out of engagement with rotor 34, best shown in FIG. 2. Rotor 34 will now freely rotate to the armed position upon plunger 80 reaching maximum travel within well 44 where the motion of rod section 56 is transmitted to tubular section 58 to drive rotor 34 to the armed position, shown in FIG. 2.

A spring 82 can be added between rod section 56 and bulkhead 76 to give switching device 10 a "hair-trigger" effect from the safe to the armed position. This hair-trigger effect is the result of spring 82 becoming loaded upon piston 16 and attached rod section 56 moving from the first position to the second position. The release of detent ball 66 at about the maximum travel of rod section 56 causes spring 82 to rapidly unload, thereby rapidly driving ball 44, by way of tubular section 58, through helical groove 50. Rotor 34 is thereby suddenly switched from the safe to the armed position.

To lock rotor 34 in either the safe or armed position, an electromechanical lock 84 of conventional type is used. Lock 84 has a bolt 86 that is biased to an extended position, shown, by a spring 88. As is shown in FIG. 1, bolt 86 is received within a recess 90 defined by rotor 34 to lock rotor 34 in a safe position. Either an internal or external signal can be used to energize lock 34 to withdraw bolt 84 so that rotor 34 can rotate. Referring to FIG. 2, rotor 34 is shown locked in an armed position. In this position, bolt 86 is received within a recess 92, which has swung into alignment with lock 84 upon rotor 34 being rotated to the armed position.

A switching circuit 94 is connected to a plurality of circuit paths 96 on rotor 34 by flexible feelers 98 that ride upon rotor 34. Circuit 94 has components that recognize the position of rotor 34 and that can also, for example, be used to send this information to lock 84 to cause lock 34 to lock rotor 34 in place or to permit rotor 34 to freely rotate. Switching circuit 94 can, of course, also be used for various other functions such as to arm and disarm explosive detonating means and the like.

Of course, modifications and variations of the invention are possible, therefore it should be understood that within the scope of the following claims, the invention may be practiced otherwise than as specifically described.

What is claimed is:

1. A pressure driven safety and arming device comprising:

a generally hollow housing having an open end;

a piston slideably disposed within said housing and substantially sealing said open end, said piston being translationally moveable between a first position proximate to said open end and a second position remote from said open end;

a rotor mounted for rotation within said housing between a safe position and an armed position, said rotor having an axis of rotation and defining an axial bore substantially axially aligned with said axis of rotation;

a shaft rigidly attached at one end to said piston for translational movement therewith, said shaft being generally coaxially aligned with said axial bore of said rotor and having a free end moveable within said axial bore;

transmission means coupling said shaft to said rotor for converting translational movement of said shaft into rotatable movement of said rotor so that said rotor is rotatable between said safe position and said armed position; and biasing means engaged between said housing and said piston for biasing said piston to said first position;

so that when a pressure of preselected magnitude acts upon said piston in opposition to said biasing means said piston moves from said first position to said second position thereby causing said rotor to rotate from said safe position to said armed position and so that when said pressure falls below said preselected magnitude said biasing means returns said piston from said second position to said first position thereby causing said rotor to rotate from said armed position to said safe position.

2. A pressure driven safety and arming device as set forth in claim 1 wherein said device defines a path for explosive means, said path being interrupted when said rotor is not in said armed position and said path being uninterrupted when said rotor is in said armed position.

3. A pressure driven safety and arming device as set forth in claim 1 further comprising means for locking said rotor in said safe position or in said armed position, said locking means being moveable between a locked and an unlocked position.

4. A pressure driven safety and arming device as set forth in claim 3 further comprising means for switching said lock means between said locked position and said unlocked position.

5. A pressure driven safety and arming device as set forth in claim 1 in which said transmission means comprises:

said shaft defining a first guide interface;

a second guide interface attached to said housing and being in engagement with said first guide interface so that said shaft is moveable longitudinally with respect to said housing and so that said shaft is precluded from moving rotationally with respect to said housing;

said shaft defining a well having an opening adjacent the periphery of said axial bore of said rotor;

a driving ball partially received within said well; and said periphery of said axial bore defining a helical groove in which said driving ball is partially received;

so that longitudinal movement of said shaft causes said driving ball to follow said helical groove so that said rotor is rotated thereby.

6. A pressure driven safety and arming device as set forth in claim 5 wherein said device defines a path for explosive means, said path being interrupted when said rotor is not in said armed position and said path being uninterrupted when said rotor is in said armed position.

7. A pressure driven safety and arming device as set forth in claim 5 further comprising rotor arresting means for precluding rotational movement of said rotor with respect to said housing until said pressure of preselected magnitude acts upon said piston, said rotor arresting means being moveable between an arresting position and a freeing position.

8. A pressure driven safety and arming device as set forth in claim 5 in which said transmission means further comprises delay coupling means characterized by:

said shaft having a rod section, said rod section having said one end fixedly attached to said piston and having a free end, said rod section defining said first guide interface;

said second guide interface being attached to said housing and being in engagement with said first guide interface so that said rod section is moveable longitudinally with respect to said housing and so that said rod section is precluded from moving rotationally with respect to said housing;

said shaft having a tubular section, said tubular section extending through said rotor for slideable engagement therewith and defining said well proximate to a first end thereof in which said driving ball is partially received, said tubular section defining an open-ended cylinder at a second end thereof in which said free end of said rod is slideably received for translational movement therein; and a stop member attached to said tubular section and being in engagement with said first guide interface of said rod section to preclude rotational movement of said tubular section with respect to said rod section and to preclude said rod section from being withdrawn from said tubular section;

so that when said predetermined pressure moves said piston to said second position said rod section of said shaft translationally moves within said cylinder to abut against said tubular section so that said tubular section moves with said rod section and so that when said piston moves from said second position to said first position said rod section of said shaft abuts against said stop member so that said tubular section moves with said rod section.

9. A pressure driven safety and arming device as set forth in claim 8 further including rotor arresting means characterized by:

said tubular section defining a detent well at an end remote from said one end of said cylinder, said detent well being in communication with said cylinder and having an opening adjacent the periphery of said axial bore of said rotor;

a detent ball partially received within said detent well;

said periphery of said axial bore defining an indentation in which said detent ball is partially received; and a detent moveably retained within said detent well of said tubular section and being resiliently biased to urge said detent ball into said indentation of said rotor to preclude movement of said rotor with respect to said tubular section of said shaft, said rod section of said shaft moveably engaging said detent so that said detent ball becomes unengaged with said rotor and so that said detent abuts against said detent well so that said tubular section moves with said rod section when said predetermined pressure moves said piston to said second position.

10. A pressure driven safety and arming device as set forth in claim 9 in which:

said tubular section has a bulkhead separating said cylinder from said detent well, said bulkhead defining a passage through which said rod section travels to engage said detent; and a resilient member disposed between said rod section and said bulkhead so that movement of said piston from said first position to said second position loads said resilient member until said detent ball becomes unengaged with said rotor upon which said resilient member is free to unload.

* * * * *